United States Patent [19]

Thompson et al.

[11] Patent Number: 4,916,483

[45] Date of Patent: Apr. 10, 1990

[54] SMALL ANGLE DOCUMENT ROTATOR IN AN IMAGING DEVICE PLATEN COVER

[75] Inventors: David M. Thompson; Richard C. Hogestyn, both of Webster; James O. Mitchel, Rochester, all of N.Y.

[73] Assignee: Xerox Corporation, Stamford, Conn.

[21] Appl. No.: 265,627

[22] Filed: Nov. 1, 1988

[51] Int. Cl.⁴ ............................................. G03B 27/62
[52] U.S. Cl. ....................................................... 355/75
[58] Field of Search ........................................... 355/75

[56] References Cited

U.S. PATENT DOCUMENTS

| 2,510,363 | 6/1950 | Anderson | 88/24 |
| 4,013,362 | 3/1977 | Beckman, Jr. | 355/75 |
| 4,318,135 | 3/1982 | Allis et al. | 358/294 |
| 4,506,301 | 3/1985 | Kingsley et al. | 358/280 |
| 4,682,242 | 7/1987 | Sugita | 358/285 |
| 4,771,333 | 9/1988 | Michaels | 358/213.29 |

FOREIGN PATENT DOCUMENTS

| 239723 | 11/1985 | Japan | 355/75 |
| 22469 | of 1905 | United Kingdom . | |

Primary Examiner—Donald A. Griffin
Attorney, Agent, or Firm—Mark Costello

[57] ABSTRACT

A device for rotating by a small angle, documents placed on an imaging device platen, for improved skew angle registration during imaging. An imaging device provided with a platen cover for covering the imaging platen of the imaging device includes document engagement member rotatably supported on the platen cover, between the imaging platen and the platen cover when the platen cover is in a closed position with respect to the platen of the imaging device. The document engagement member has a document contacting surface providing substantially non-slipping engagement of the document engagement member with documents placed on the platen when the platen cover is closed. An arrangement is provided for rotational adjustment of documents placed on the platen, at an externally accessible surface of the platen cover, and coupled to the document engagment member, for rotating the document engagement member through a small angle increment, and by consequence, documents engaged thereto, with respect to the platen.

8 Claims, 2 Drawing Sheets

SMALL ANGLE DOCUMENT ROTATOR IN AN IMAGING DEVICE PLATEN COVER

The present invention relates generally to a device for rotating by a small angle documents placed on an imaging device platen, for improved skew angle registration during imaging.

INCORPORATION BY REFERENCE

U.S.-A No. 4,771,333 to Michaels, is incorporated by reference herein for its description of an electronic image scanning device. U.S.-A No. 4,682,242 to Sugita; U.S.-A No. 4,013,362 to Beckman Jr.; GB- No. 22,469(1905); U.S.-A No. 2,510,363 to Anderson; U.S.-A No. 4,506,301 to Kingsley et al.; and U.S.-A No. 4,318,135 to Allis et al. are also incorporated by reference as background for the discussion of skew correction.

BACKGROUND OF THE INVENTION

Documents may be "scanned" by an electronic image scanning device, in which a plurality of photosensitive devices are arranged to sense light imagewise reflected from a document to produce an electronic output indicative of sensed light intensity. In a simple arrangement, documents are placed on a transparent imaging support platen, and relative movement between the sensors and the document is provided, simultaneously with illumination of the document. As used herein, the direction of relative is referred to as the slow scan direction, while the direction of electronic acquisition of data is referred to as the fast scan direction. It is common practice to provide aa platen cover in association with the imaging platen to sandwich the document into fixed placement on the imaging platen, and to prevent intrusion of extraneous light. Generally, the platen cover portion that is placed adjacent the platen for the support of the document is colored to provide a uniform background.

It is often noted in the output of electronic image scanning devices, either at soft displays, such as video display terminals (VDT's), or in printed samples of the scanned information, that lines are not exactly parallel to the slow scan or fast scan directions. In FIG. 1, stepped or staircased lines A and B are compared with the non-stepped appearance of lines C and D, parallel to the fast scan direction. While this problem is not desirable, it is usually not unacceptable, when it is requied or expected. However, for lines that are desired to be parallel to the slow scan or fast scan directions, the stepped appearance is completely unacceptable. Unfortunately, it cannot be guaranteed that the document to be scanned provides the scanned image at the desired skew orientation. The image may not be placed squarely on the document, the edges of the document may not be squared, causing the image to be skewed on registration of an edge, or the operator may not precisely align the document at the correct registration position on the platen. All these situations may result in a skewed image and thus stepped lines.

It has been determined that the skew of the images in the typical staircase situations described above are not very great, and would require only minor adjustment skew correction. Unfortunately, it is not an adjustment easily accomplished by direct operator manipulation of a document. Additionally, subsequent to correcting the skew orientation of the document, closure of the platen cover may re-skew the document.

U.S.-A No. 4,682,242 to Sugita shows an arrangement wherein the sensor is mounted on a rotatable assembly to vary the skew between the document and the sensor. U.S.-A No. 4,013,362 to Beckman Jr. teaches an adjustable form guide providing registration edges that adjust to deskew the document. GB No. 22,469 (1905) and U.S.-A No. 2,510,363 to Anderson shows negative holders which may be rotated for the removal of skew during printing. U.S.-A No. 4,506,301 to Kingsley and US-A 4,318,135 to Allis at al. both provide arrangements which appear to allow rotation of the sensor in electronic image scanning devices for deskew operation.

It will be appreciated that while the stepped line appearance is characteristic of electronic image scanning devices, the problem of skewed lines degrading image presentation occurs in a wide variety of imaging techniques, including without limitation, electrophotography and other printing techniques, where it is desirable to provide lines parallel to the edge of a frame or sheet. Other situations where it is desirable to have to images closely associated, such as overlay or form printing, also suffer from the problem of skewed lines.

SUMMARY OF THE INVENTION

In accordance with the invention there is provided a device for rotating by a small angle, documents placed on an imaging device platen, for improved skew angle registration during imaging.

In accordance with one aspect of the invention, an imaging device is provided with platen cover for covering the imaging platen of the imaging device. A document engagement member is rotatably supported on the platen cover, between the imaging platen and the platen cover when the platen cover is in a closed position with respect to the platen of the imaging device. The document engagement member has a document contacting surface providing substantially non-slipping engagement of the document engagement member with documents placed on the platen when the platen cover is closed. An arrangement is provided for rotational adjustment of documents placed on the platen, at an externally accessible surface of the platen cover, and coupled to the document engagement member, for rotating the document engagement member through a small angle increment, and by consequence, documents engaged thereto, with respect to the platen.

In accordance with another aspect of the invention the document engagement member may be provided with a foam-backed, relatively high friction material of the type commonly used in frictional platen transport document handlers, to provide a frictional engagement between the document engagement member and the document for the rotational movement of the document required for the small angle of deskewing that is provided by the arrangement.

In accordance with still another aspect of the invention, the rotational adjustment arrangement may be a simple manual mechanical coupling of an operator manipulable control and the document engagement member.

These and other aspects of the invention will become apparent from the following description used to illustrate a preferred embodiment of the invention read in conjunction with the accompanying drawings in which.

Figure 1:
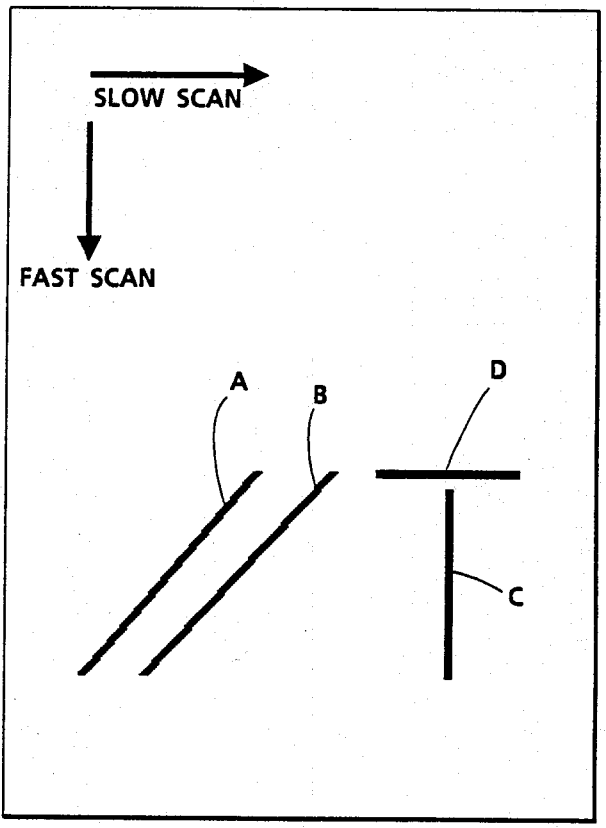
FIG. 1 shows the step or staircase pattern that occurs when scanning lines, that are not parallel to fast scan or slow scan directions of scanning, are scanned with an electronic input scanner, in comparison to properly oriented lines.
Figure 2:
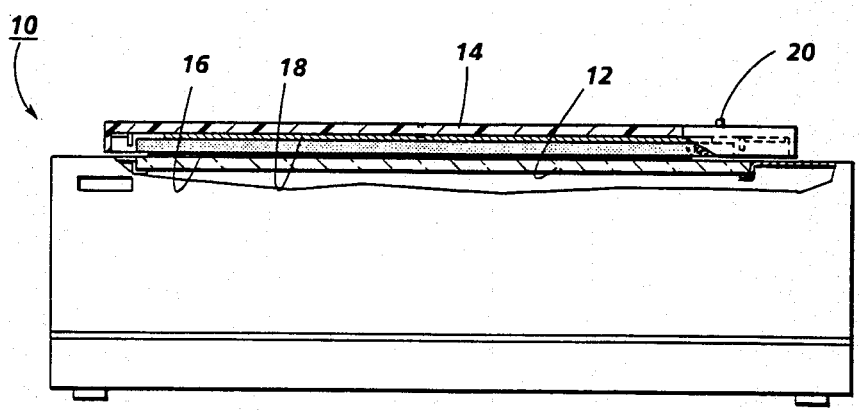
FIG. 2 shows a partially cutaway front view of an imaging device with a platen cover including the present invention.

Referring now to the drawings where the showings are for the purpose of illustrating a preferred embodiment of the invention and not for limiting same, FIG. 2 illustrates the relationship of a platen cover with a document-supporting platen of an imaging device. While the invention finds particularly advantageous use with an electronic image scanning device, for example, of the type shown in U.S.-A No. 4,771,333 to Michaels, the invention has application to other imaging devices, such as electrophotographic copiers, photographic printers, lithographic devices, etc, where skew orientation of an original image placed at an imaging location is important to final image quality. FIG. 2 demonstrates a scanning device 10 (operational elements of the scanning device not shown) having a transparent platen 12 for supporting documents face down for scanning by a moving scanning device (not shown) arranged for scanning operation below the document. A platen cover 14, covers the entire platen 12, and much of the remainder of the upper surface of imaging device 10 when in the demonstrated closed position, to maintain document 16 in fixed relationship with platen 12, and to prevent intrusion of extraneous illumination from the environment about the imaging device. A document engagement member 18 is supported for rotating movement on the underside of platen cover 14 responsive to manipulation of thumb wheel 20, as will be further described hereinbelow.

Figure 3:
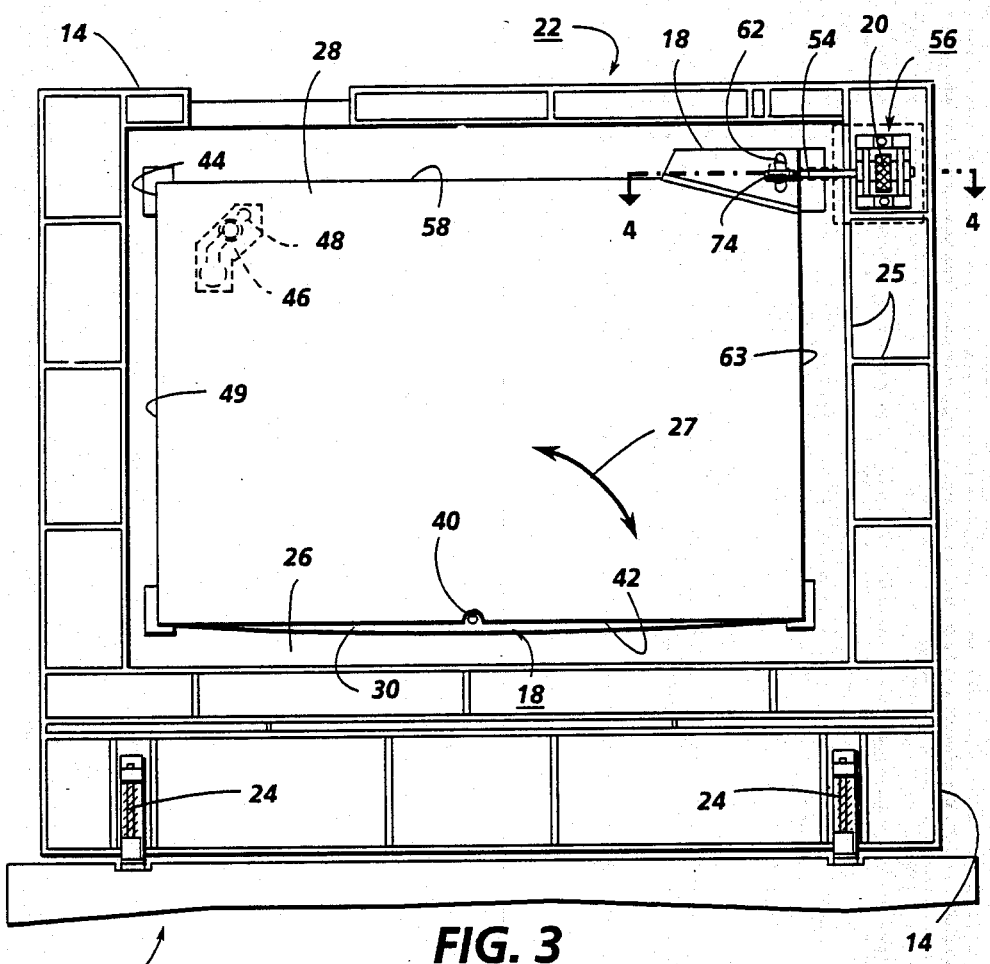
FIG. 3 is a perspective front view of the underside of the platen cover including the present invention.

In accordance with FIG. 3, platen cover 14, shown in an open position revealing its underside 22 with respect to imaging device 10, is mounted for hinged opening and closing movement on spring hinges 24. Platen cover 14 may be easily made of a plastic material by injection molding or other process, and is generally provided with a number of support ribs, generally indicated as 25 throughout its understructure to provide rigidity. However, an area 26 is defined by the ribbing, provided for the support of document engagement member 18, and allowing space for rotation thereof through a relatively small angle of motion, direction indicated by the double ended arrow 27.

Figure 3A:
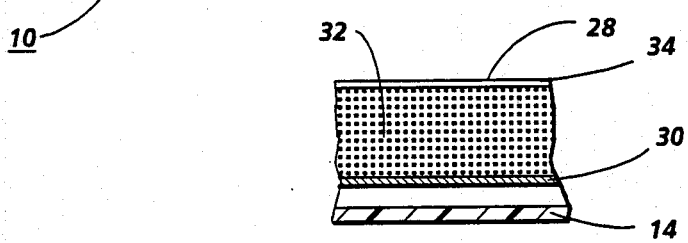
FIG. 3A is a cutaway view of a segment of the document engagement member.

Document engagement member 18 is a generally flat member, supported to provide an engagement surface 28 in frictional engagement with documents placed on the platen. In accordance with FIG. 3A, document engagement member 18 may be constructed with a substantially rigid substrate 30 in abutment against the underside surface of platen cover 14, a foam layer 32 overlying substrate 30, and supporting an elastomer surface layer 34 forming engagement surface 28. Elastomer surface layer 34 is desirably formed of a material having a relatively high coefficient of friction with paper, such as for example EPDM, a rubbery elastomer commonly used for wide friction belt document transport devices. Desirably, although not necessarily, elastomer surface layer 34 has a uniform light background color, to avoid dark edges surrounding scanned documents. Foam layer 32 and elastomer surface layer 34 extend to cover imaging platen 12, when platen cover 14 is in a closed position, while rigid substrate 30 extends somewhat beyond the edges of imaging platen 12 to accommodate the arrangement coupling document engagement member 18 with platen cover 14 and thumb wheel 20, as will be hereinafter described.

With reference again to FIG. 3, in the described embodiment document engagement member 18 may be conveniently supported for rotation on platen cover 14. A pivot pin 40, at rear edge 42 of document engagement member 18 (operator view, platen cover closed), extends through rigid substrate 30 into fixed engagement with platen cover 14, but allows free rotational movement of document engagement member 18 thereabout. A pin and slot arrangement supports document engagement member 18 adjacent the front left corner 44, with a pin member 46 extending through a slot 48 defined in rigid substrate 30, in a manner allowing travel therethrough, to a fixed mounting in platen cover 14. Slot 48 is arranged somewhat canted with respect to left side edge 49, allowing for rotation of document engagement member 18. The pin and slot assembly may be covered by foam layer 32 and elastomer surface layer 34.

Figure 4:
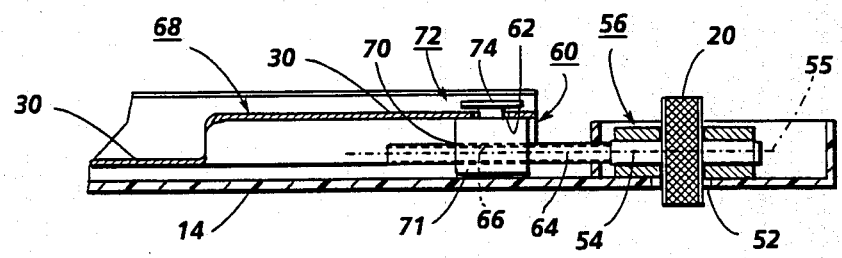
FIG. 4 is an illustration of the linkage between an operator manipulable control and the document engagement member.

To rotate document engagement member 18, and with reference to FIGS. 3 and 4, thumb wheel 20 or similar manually manipulatable member is provided, extending through an opening 52 defined through platen cover 14. Thumb wheel 20 is mounted on drive shaft 54, arranged with the rotational axis 55 of the shaft parallel to platen cover 14. Drive shaft 54 is supported on a bearing block 56 fixed to platen cover 14, near the front edge 58 of document engagement member 18. Drive pin 60 is supported for free movement in a drive slot 62, defined in rigid substrate 30 adjacent from edge 58, and generally parallel to right side edge 63 of document engagement member 18 to allow for rotation thereof. Drive shaft 54 and drive pin 60 are provided with complementary threadings 64 and 66, as will be further explained, such that with rotation of thumb wheel 20, rotation of drive shaft 54 forces movement of drive pin 60 along drive shaft 54. Movement of drive pin 60 along drive shaft 54 within slot 62 urges document engagement member 18 about the axis defined by pivot point 40, and limited by the distance that pin 46 and drive pin 60 travel through slot 46 and drive slot 62, respectively, as well as the area defined in the platen cover 14 for supporting document engagement member 18.

In a preferred embodiment, as shown in FIG. 4, substrate 30 is shaped to accommodate the drive pin and shaft arrangement, forming a housing 68 thereabout. Drive pin 60 is a molded plastic member, with a central aperture 70 defined through a cylindrical body portion 71, the aperture threaded for complementary fit with drive shaft 54. A retaining portion 72 may be provided on pin 60 for the retention of pin 60 in drive slot 62. To form retaining portion 72, an upper end of the pin 60 is shaped to form an elongated retaining member 74, parallel with aperture 70, and narrow enough to fit through drive slot 62, when oriented parallel therewith. Elongated retaining member 74 is undercut where retaining portion 72 meets cylindrical body portion 71. Thus, drive pin 60 may be inserted into drive slot 62, with elongated retaining member 74 parallel to drive slot 62, and rotated 90° to bring aperture 70 into line with drive shaft 54, and thereby lock the pin into vertical orientation with substrate 30, with substrate 30 sandwiched between elongated retaining member 74 and cylindrical body portion 71.

It will be appreciated that other mechanical linkages for rotation of the document engagement member are possible, including slide or lever arrangements which extend through the platen cover for driving the document engagement member in its rotational movement. Of course, rather than a thumb wheel arrangement, a motorized drive arrangement is certainly possible, with appropriate controls enabling operation of the device when the platen cover is in a closed position.

The invention has been described with reference to a preferred embodiment. Obviously modifications will occur to others upon reading and understanding the specification taken together with the drawings. This embodiment is but one example, and various alternatives modifications, variations or improvements may be made by those skilled in the art from this teaching which are intended to be encompassed by the following claims.

We claim:

1. In an imaging device having a platen cover, which in a closed position covers a document supporting imaging platen, and including a document rotator for rotating documents on the imaging platen with the platen cover in a closed position through a small angle of rotation, the document rotator including:
    a document engagement member rotatably supported on the platen cover, between the imaging platen and the platen cover when the platen cover is in a closed position;
    the document engagement member provided with a document contacting surface providing a substantially non-slipping frictional engagement of the document engagement member with documents placed on the platen when the platen cover is closed;
    a manually manipulatable member accessible from the externally accessible surface of the platen cover in the closed position; and
    a mechanical coupling connecting the manipulatable member with the document engagement member and responsive to manipulation of the manipulatable member for causing the rotating movement of the document engagement member, and by consequence, documents engaged thereto, with respect to the platen, and
    the document engagement member is a substantially rigid member, supporting a foam-backed elastomer material that forms the document contacting surface.

2. In an imaging device having a platen cover, which in a closed position covers a document supporting imaging plate, and including a document rotator for rotating documents on the imaging platen with the platen cover in a closed position through a small angle of rotation, the document rotator including:
    a document engagement member rotatably supported on the platen cover, between the imaging platen and the platen cover when the platen cover is in a closed position;
    the document engagement member provided with a document contacting surface providing a substantially non-slipping frictional engagement of the document engagement member with documents placed on the platen when the platen cover is closed;
    a manually manipulatable member accessible from the externally accessible surface of the platen cover in the closed position; and
    a mechanical coupling connecting the manipulatable member with the document engagement member and responsive to manipulation of the manipulatable member for causing the rotating movement of the document engagement member, and by consequence, documents engaged thereto, with respect to the platen, and
    wherein the operator manipulatable member comprises a thumb wheel, extending through the platen cover.

3. In an imaging device having a platen cover, which in a closed position covers a document supporting imaging platen, and including a document rotator for rotating documents on the imaging platen with the platen cover in a closed position through a small angle of rotation, the document rotator including:
    a document engagement member rotatably supported on the platen cover, between the imaging platen and the platen cover when the platen cover is in a closed position;
    the document engagement member provided with a document contacting surface providing a substantially non-slipping frictional engagement of the document engagement member with documents placed on the platen when the platen cover is closed;
    a manually manipulatable member accessible from the externally accessible surface of the platen cover in the closed position; and
    a mechanical coupling connecting the manipulatable member with the document engagement member and responsive to manipulation of the manipulatable member for causing the rotating movement of the document engagement member, and by consequence, documents engaged thereto, with respect to the platen, and
    wherein the mechanical coupling connecting the operator manipulatable member with the document engagement member includes a threaded shaft rotatable by the operator manipulatable member, and a complementary threaded pin engaged with the document engagement member which, upon rotation of the shaft, moves the document engagement member about a pivot point, whereby rotation of the document engagement member is provided.

4. The imaging device as defined in claim 3 wherein the operator manipulatable member includes a thumb wheel, extending through the platen cover.

5. In an imaging device having a platen cover, which in a closed position covers a document supporting imaging platen, and including a document rotator for rotating documents on the imaging platen with the platen cover in a closed position through a small angle of rotation, the document rotator including:
    a document engagement member supported on the platen cover between the imaging platen and the platen cover when the platen cover is in a closed position for rotating movement about a pivot point;
    the document engagement member having a document contacting surface providing a substantially non-slipping frictional engagement of the document engagement member with documents placed on the platen when the platen cover is closed;

a manually manipulatable thumb wheel, extending through the platen cover, accessible from an externally accessible surface of the platen cover in the closed position; and a mechanical coupling connecting the thumb wheel with the document engagement member including a threaded shaft rotatable by the thumb wheel, and a complementary threaded pin, movably seated in a slot formed in the document engagement member, the threaded pin, upon rotation of the shaft, moving the document engagement member about the pivot point, and by consequence, documents engaged thereto, with respect to the platen.

6. The imaging device as defined in claim 5 wherein the document contacting surface provides a greater coefficient of friction between the contacting surface and the document than between the document and the imaging platen.

7. The imaging device as defined in claim 5 wherein the document engagement member is a substantially rigid member, supporting a foam-backed elastomer material to form the document contacting surface.

8. In an imaging device having a platen cover, which in a closed position covers a document supporting imaging platen, including a document rotator for rotating documents on the imaging platen with the platen cover in a closed position through a small angle of rotation, the document rotator including:

a document engagement member rotatably supported on the platen cover, between the imaging platen and the platen cover when the platen cover is in a closed position;

the document engagement member provided with a document contacting surface providing substantially non-slipping engagement of the document engagement member with documents placed on the platen when the platen cover is in a closed position, said document contacting surface sized to cover said platen and colored to minimize edge shown around; and adjustment means accessible from an externally accessible surface of the platen cover in the closed position, and coupled to the document engagement member, for rotating the document engagement member through a small angle increment, and by consequence, documents engaged thereto, with respect to the platen.

* * * * *